July 1, 1969 — C. E. CLELAND ET AL — 3,452,734
PRECISION BAND-TYPE CUTTING MACHINE
Filed Aug. 19, 1968

Inventors
Charles E. Cleland
Eugene N. Connoy

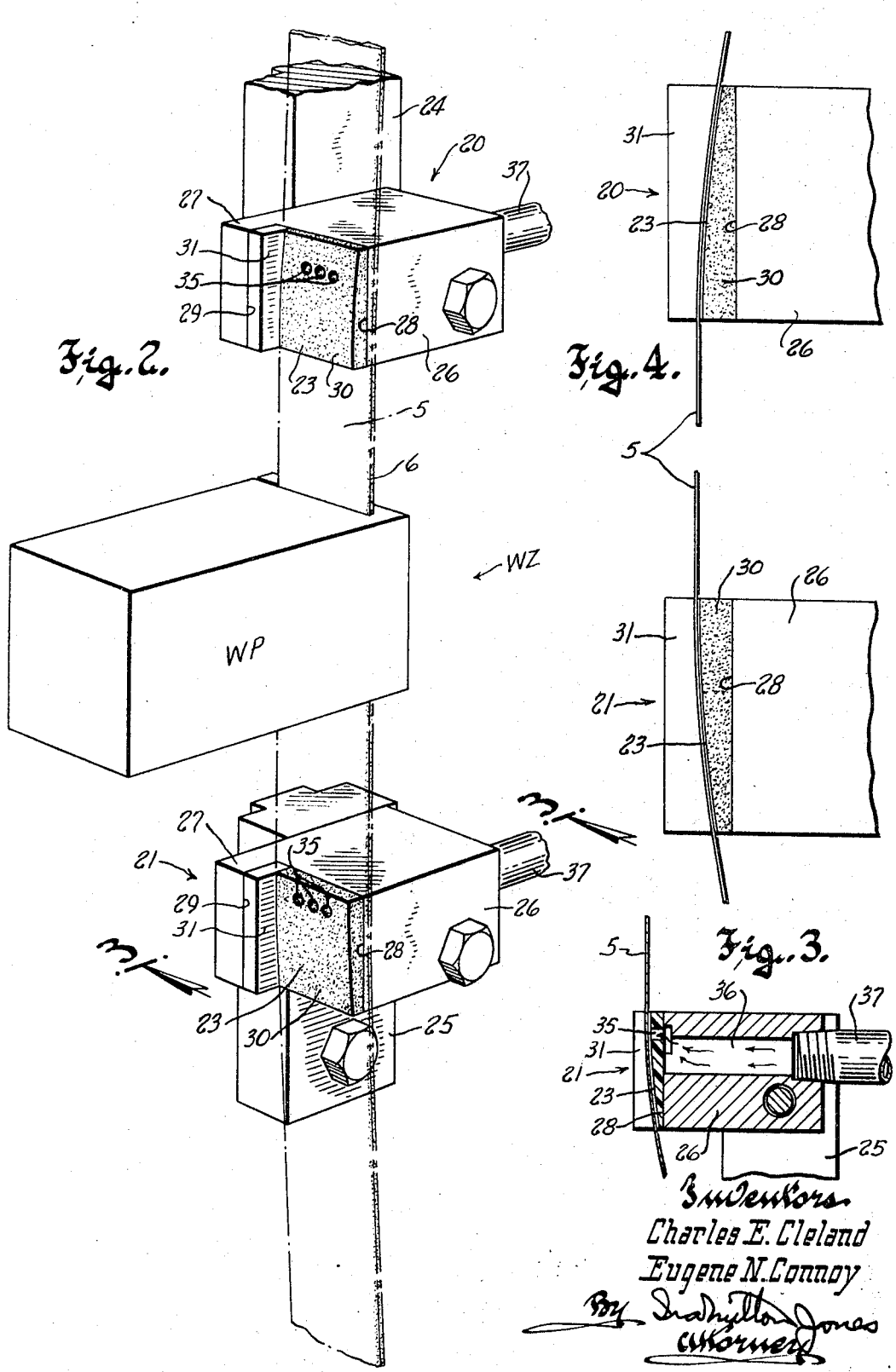

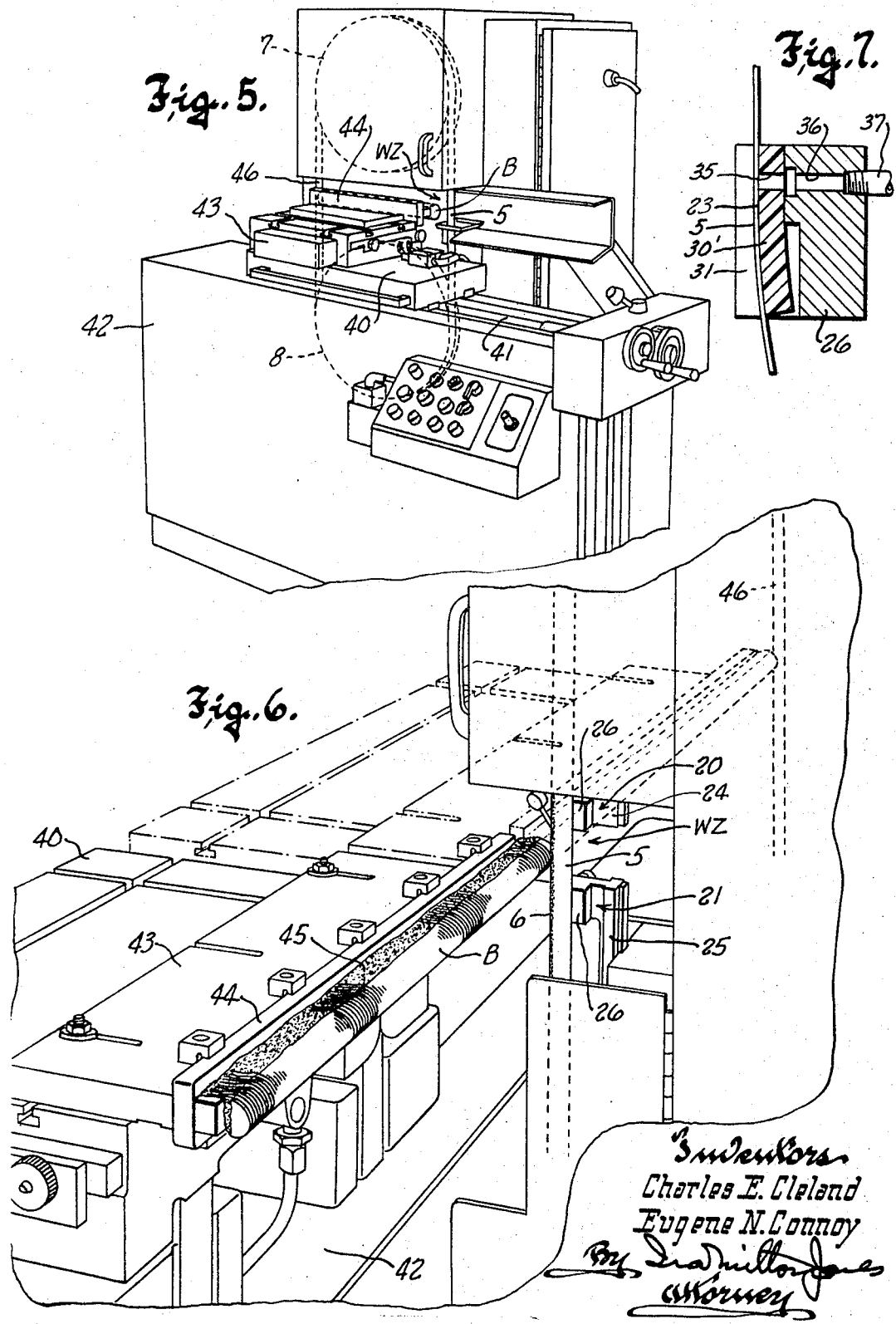

3,452,734
PRECISION BAND-TYPE CUTTING MACHINE
Charles E. Cleland, Edina, and Eugene N. Connoy, Minneapolis, Minn., assignors to Continental Machines, Inc., Savage, Minn., a corporation of Minnesota
Continuation-in-part of application Ser. No. 600,214, Dec. 8, 1966. This application Aug. 19, 1968, Ser. No. 755,500
Int. Cl. B28d *1/08;* B26d *1/54;* B27b *13/10*
U.S. Cl. 125—21                                                9 Claims

ABSTRACT OF THE DISCLOSURE

An endless band-type cutting tool for slicing a bar of semi-conductor material adhered to an elongated holder into thin slices, in a manner which leaves all of the slices adhering to the holder. The cutting band has a diamond-coated cutting edge and its cutting stretch is constrained to true straight line travel by having the band ride on fluid flooded curved surfaces of stationary guide shoes which are offset in the same direction from the plane of tangency to the pulleys over which the band travels.

---

This invention, like that of the copending application Ser. No. 600,214, filed Dec. 8, 1966, now abandoned, of which this application is a continuation-in-part, relates to cutting machines especially adapted for the cutting and slicing of extremely hard and brittle semi-conductor materials such as germanium and silicon crystals.

Heretofore, the cutting or slicing of materials such as silicon crystals could be done successfully only with so-called I.D. slicing machines, in which the cutting tool consists of a rapidly rotating thin annular disc or blade, the inner edge of which does the cutting. Examples of such inside diameter rotary cutting machines will be found in the Sayers Patent No. 2,713,339, and in the Heinrich Patent No. 3,039,235.

Inside diameter annular cutting blades require insertion of the work to be cut into the hole in the blade. This obviously limits the capacity of the machine and restricts its use to relatively small work, since the diameter of the annular blade is rather severely limited by such factors as centrifugal force. Also, the manner in which inside diameter cutting blades are mounted limits the length of the piece that can be accommodated to only a few inches.

These disadvantages cannot be overcome by making the periphery of the rotary cutting blade its cutting edge, because it is impossible to obtain the needed rigidity in a blade thin enough to cut an acceptable kerf. The relatively high cost of the materials that are to be cut demands that the kerf be kept just as narrow as possible.

Recognition that outside diameter cutting discs were out of the question, quite naturally directed attention to band type cutting machines as a possible answer to the need for accommodating larger workpieces; but band type cutting machines heretofore available lacked the precision needed to cut and slice germanium and silicon crystals. In even the best diamond edged endless band cutting machines, the cutting stretch of the band did not run true enough to duplicate the accuracy of the inside diameter rotary cutting machies.

While adherence to closer tolerances in the machining and assembly of all parts of the machine will contribute to the attainment of the needed precision, the heart of the problem is centered in the band guides which engage the band as it enters and leaves the work zone to define the cutting stretch of the band. Unless these guides stabilize the cutting stretch against even the slightest flutter or deviation from an absolutely true straight line travel, the required cutting precision will not be had. With an abrasive edged band this result is more difficult to achieve than it is with a toothed band, since a diamond edged band will not lock itself into the work as a toothed band does.

Band guides heretofore employed on band type cutting machines were either of the fixed shoe type, such as that of the Wilkie Patent No. 2,311,426; the automatically adjustable type shown in the Chapman et al. Patent No. 2,934,106; or of the roller type shown in the Crane Patent No. 2,601,065. Bearing in mind that, for all practical purposes, uniform thickness bands do not exist, the fixed shoe guides cannot hold the band with the required firmness, since the clearance between the band engaging surfaces of the shoes must be great enough to accommodate the thickest portion of the band which may be only a short part of its total length.

In the automatically adjustable type of guide, one of the shoes is fixed and the other is pressed against the band. While this may eliminate the objectionable clearance problem of the fixed shoe type, it results in excessive wear on the band. This can be readily understood when it is appreciated that the band may be only .004" thick and that the "dust" which results from cutting materials like silicon crystals is very abrasive.

The roller type guides, the only other alternative, are objectionable because of the inevitable vibration that results from the use of roller guides at the high band speeds—often in excess of five thousand feet per minute—employed in abrasive edged band type cutting machines.

An object of the invention, therefore, is to provide a band type cutting machine equipped with band guides that will assure the precision needed to accurately cut or slice such materials as germanium and silicon crystals.

Another object and purpose of this invention is to provide a method and apparatus by which relatively long bar-like pieces of very hard crystalline material—as, for instance, a piece two inches (2") in diameter and twenty inches (20") long—can be completely sliced into thin wafers on the order of .010" thick in one continuous machine operation and without in anywise disturbing the wafers or their positions relative to one another as they are successively cut from the bar, so that when the entire bar has been sliced into wafers, the resulting "stack" or group of wafers can be handled en masse and retained in their "stacked" relationship until subsequent operations require that they be separated.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate two complete examples of the physical embodiment of the invention constructed according to the best modes so far devised for the practical application of the principles thereof, and in which:

FIGURE 2 is an enlarged perspective view of the band guiding and supporting means of this invention, with the cutting band shown in broken lines in the act of cutting through a work piece;

FIGURE 3 is a detail cross sectional view through FIGURE 2 on the plane of the line 3—3;

FIGURE 4 is a fragmentary front view of the cutting band and its supporting and guiding means;

FIGURE 5 is a front perspective view of a complete band-type cutting or slicing machine, set up to completely slice a relatively long bar of semi-conductor material into very thin wafers and in one continuous machine operation;

FIGURE 6 is a perspective view on a somewhat enlarged scale of the structure in the work zone of the machine, with the bar of semi-conductor material almost completely cut into wafers; and FIGURE 7 is a view similar to FIGURE 3, but illustrating a slightly modified supporting shoe construction.

Figure 1:
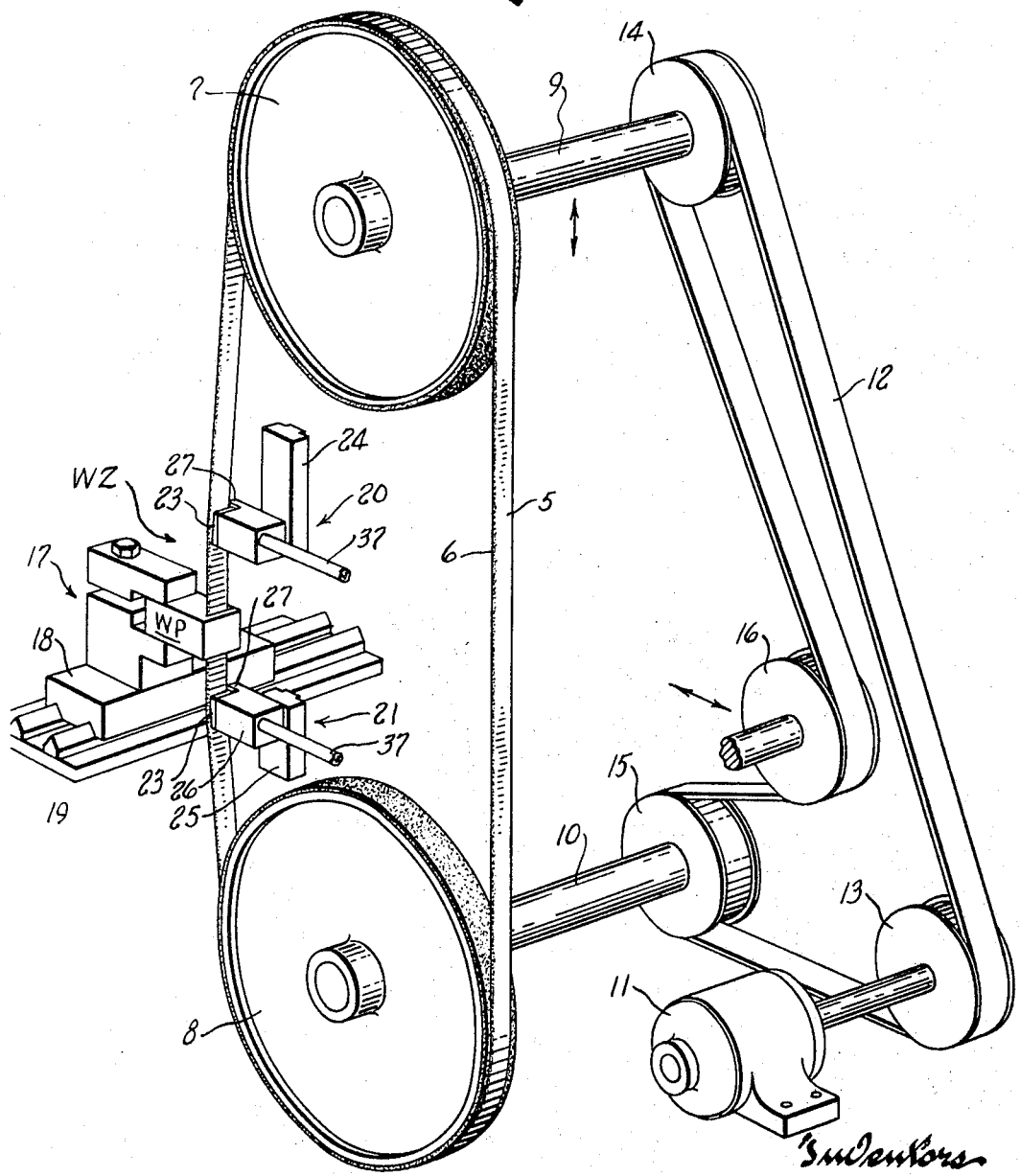
FIGURE 1 is a perspective view diagrammatically illustrating those elements of a band-type cutting machine involved in this invention.

Referring now particularly to the accompanying drawings, the numeral 5 designates an endless cutting band of the type commonly referred to as a diamond edged band, in that the cutting edge 6 of the band consists of diamond bort or other suitable abrasive bonded to a very thin steel band. The band is trained over a pair of spaced upper and lower pulleys 7 and 8. The shafts 9 and 10 on which these pulleys are mounted are suitably journalled in bearings forming part of the general structure of the machine, which has not been shown in FIGURE 1 for sake of clarity, but which is illustrated in FIGURE 5 and partially shown in FIGURE 6. As is customary, the mounting of one of the pulleys—usually the upper one—provides for up and down adjustment to enable the endless band 5 to be appropriately tensioned.

At least one of the pulleys is power driven, usually the lower pulley; but as shown in FIGURE 1, both pulleys may be drivingly connected with an electric drive motor 11 by means of a belt 12 which drivingly connects a pulley 13 on the motor shaft with pulleys 14 and 15 fixed respectively to the upper and lower shafts 9 and 10. An adjustable idler pulley 16 engages the drive belt 12 to maintain it under proper tension. By driving both pulleys any tendency for the band to stretch is offset. It has been found, though, that a band .004" thick and one-half inch wide can be successfully used in a machine in which only the lower pulley is driven.

The downwardly moving stretch of the band 5 travels through the work zone WZ of the machine for operative engagement with a workpiece WP. In FIGURES 1 and 2, the workpiece is merely exemplary of any piece of material to be cut, so that the manner in which it is held is unimportant as long as it is solidly gripped and capable of being fed into engagement with the cutting edge of the band. Thus it may be simply gripped between a pair of vise jaws 17 mounted on a carriage 18 that is slidably mounted on fixed ways 19.

As in all band type cutting machines, upper and lower band guides 20 and 21 supportingly engage the downwardly moving stretch of the band, and by such engagement define the cutting stretch of the band which, of course, is the portion thereof that spans the distance between the guides. Because of the tension on the band, its downwardly travelling stretch tends to travel in a plane tangent to the treads of the pulleys, and heretofore the guides have generally been designed to accommodate this tendency.

With this invention, however, the downwardly travelling stretch of the band is displaced from the plane of tangency, i.e. the plane passing through the work zone of the machine and tangent to the peripheral treads of the pulleys. By virtue of that displacement and the specific manner in which the band guides are constructed and support the band, the cutting stretch of the band, that is, the portion thereof spanning the guides—travels in a straight line without any tendency to flutter. To this end, the upper and lower band guides 20 and 21 each have a band supporting surface 23, both of which face the same side of the band and are displaced or offset in the same direction from the plane of tangency. The band guides are fixed to supports 24 and 25 which are vertically adjustably secured in any suitable manner to the frame of the machine, so that the distance between the guides may be adjusted to increase or decrease the length of the cutting span of the band as needed to accommodate different sized workpieces. In the machine illustrated, the band is displaced outwardly, but it should be understood that the displacement could be inward.

Each of the band guides 20 and 21 further comprises a block 26 having a stepped outer end portion 27 to provide two right-angularly disposed surfaces 28 and 29. The surfaces 28 have shoes 30 fixed thereto, the outer faces of which provide the band-supporting surfaces 23 of the band guides, and are curved, as best seen in FIGURE 4. The other surface 29 has a block 31 of carbide or other suitable hard, wear-resistant metal fixed thereto to provide a flat shoulder or backup support on which the smooth rear edge of the band rides. The width of each shoe, that is, the distance from its associated flat shoulder or backup support to the front edge of the shoe, is slightly less than the width of the band so that the abrasive edge 6 of the band does not contact the shoe.

The shoes 30 are preferably formed of resilient wear-resistant material, polyurethane having been found very satisfactory; and the curvature of their front faces, across which the band travels, is such that neither in approaching the upstream shoe nor in leaving the downstream shoe will the band be flexed sharper than a five inch radius. Preferably the curved surfaces 23 are tangent to the stretches of the band extending from the guides to the pulleys and also the intervening portion of the band which provides the cutting stretch. Moreover, it is preferable that the curvature of the surfaces 23 be uniform and the radius thereof at least that of the pulleys—in any event, greater than five inches—so as not to require more severe flexure of the band than that resulting from its being trained over the pulleys.

Despite the fact that the surfaces 23 are exceptionally smooth, it has been found necessary to flood the interface between the band and the guide shoes with fluid which is preferably the conventional coolant used in machine tools of this type, although water and even air could be used. To enable this flooding of the interface, each shoe has a number of ports 35 opening to its curved front face and leading from a manifold 36 in the block 26, to which coolant or other suitable fluid is supplied through a duct 37. The ports 35 are placed to debouch into the upstream ends of the interface. This assures the entire interface being flooded and the maintenance of a film of fluid between the band and the contiguous surface of the shoes.

The presence of the film of fluid between the band and the shoes spaces the band a minute uniform distance from the shoes, and in so doing achieves two very important results. The first of these—which is perhaps obvious—is the elimination of destructive wear on the band. While wear should always be avoided, if possible, even very slight wear on a band as thin as those of this machine results in premature failure and the need for costly replacement. Diamond-edged bands are expensive. Secondly—from the standpoint of achieving the desired precision in the cutting or slicing of silicon and germanium crystals—the film of fluid between the band and the shoes is most important. In fact, it was not until the interface between the band and the shoes was flooded with a film of fluid—conventional coolant was employed—that the travel of the band through its cutting stretch was true and free from the flutter or vibration which heretofore made it impossible to cut with the required precision.

An alternative shoe construction is illustrated in FIGURE 7. As there shown, the band supporting portion of each shoe may consist of an initially flat oblong bar 30' of resiliently yieldable polyurethane or the like, so mounted that it is free to flex and shape itself to the band riding thereon.

The exceptional precision with which the machine of this invention cuts makes it possible to employ a new and improved method of slicing silicon crystals and other semi-conductor material into very thin wafers. Prior to this invention, the cutting of silicon and other semiconductor crystals into thin slices was fraught with a host of difficulties, not least of which was the handling of the slices or wafers after they were cut from the crystal. The aforementioned Heinrich Patent No. 3,039,-235, discusses this problem in considerable detail, but it is noteworthy that the criticism of the then prior art contained in that patent is concerned only with the cutting of crystals by means of I.D. slicers.

Heinrich too employed an I.D. slicer, but mounted the annular cutter disc for rotation about a vertical axis with the crystal arranged to be indexed downwardly. His solution of the problems involved in handling the severed slices or wafers consisted in allowing them to drop into a receptacle, which conceivably can lead to substantial breakage.

With this invention a long bar-like silicon crystal or other similar semi-conductor material can be completely sliced into very thin wafers with every wafer independent of its neighbors but with all of them held against dropping or moving with respect to one another. To this end, the machine shown in FIGURES 5 and 6 was developed. This machine has a carriage 40 mounted on ways 41 to move laterally across the base 42 of the machine along a horizontal path perpendicular to the axes of the pulleys 7 and 8. Mounted on the carriage 40 for translatory motion at right angles to the movement of the carriage and hence parallel to the axes of the pulleys, is a table 43.

The table 43 is provided with means to secure workpieces thereto for presentation to the cutting stretch of the band. In this case the workpiece is a bar B of silicon which is adhered to an elongated supporting member 44 by beeswax 45 or the like. Any suitable means may be employed to secure the supporting member 44 to the table 43, but the supporting member must be at least as long as the silicon crystal bar adhered thereto, and the mounting should hold the bar with its axis parallel to the path of movement of the carriage 40.

By controlled movement of the carriage the silicon bar is indexed to successively present uncut portions thereof to the cutting stretch of the band; while forward traverse of the table across the carriage feeds the crystal bar against the cutting band. Rearward traverse of the table, of course, retracts the crystal and allows the same to be indexed for the next cut. In making a cut the table is advanced far enough to have the band cut completely through the crystal, but not through the supporting member. Accordingly, the wafers cut from the crystal bar remain attached to the supporting member so that the entire bar can be sliced into thin wafers without danger of having the wafers broken. When the entire bar has been cut into slices or wafers, the supporting member with the "stack" of individual wafers still attached thereto can be removed from the machine and retained in this form until subsequent operations require the wafers to be handled individually.

The indexing movement of the carriage and the feeding and retracting traverse of the table are, of course, automatically performed and continue until the entire crystal bar has been sliced into wafers.

A very important feature of the invention resides in the fact that the spacial relationship of the cutting stretch of the band to the back stretch 46 thereof (FIGURE 5) is sufficient to accommodate a relatively long crystal bar therebetween, either at the start of the slicing operation shown in FIGURE 5 and in dotted lines in FIGURE 6, or at the conclusion of the slicing operation, depending upon whether the machine indexes from left to right (as shown) or from right to left.

Since the distance between the cutting stretch of the band and its back stretch limits the length of the crystal bar that can be handled in one machine set-up, the pulleys 7 and 8 should be large enough to provide the needed clearance which is quite reasonable since silicon crystals seldom exceed twenty inches in length. This requires a pulley diameter of only slightly more than twenty inches. If greater clearance is desired, the back stretch of the band can be displaced by idler pulleys.

From the foregoing description and the accompanying drawings, it should be apparent that by making it possible to achieve precision cutting with an endless band-type cutting tool and enabling a relatively long bar to be sliced into thin wafers in one continuous operation, this invention has substantially advanced the art of preparing silicon crystals and other semi-conductors for microcircuitry.

What is claimed as our invention is:

1. A band-type cutting machine especially adapted for cutting and slicing hard crystalline materials, wherein a thin endless flexible band having an abrasive cutting edge and a smooth back edge, is trained over spaced pulleys with one stretch of the band passing through a work zone between the pulleys, the band being under tension so that said stretch thereof tends to remain in a plane tangent to the periphery of the pulleys, at least one of said pulleys being power driven to impart linear motion to the band, and wherein a pair of spaced apart band supports at the entrance into and exit from the work zone have band supporting surfaces to guide and support said stretch of the band for travel through the work zone to define the cutting stretch of the band, said machine being characterized by the combination of:

means rigidly mounting the band supports with their band supporting surfaces offset in the same direction from said plane of tangency and bearing against only one and the same side of the band to thus hold the cutting stretch of the band displaced from said plane of tangency; and means for maintaining a film of fluid in the interface between the band and said surfaces of the band supports to minutely space the band from said surfaces and prevent friction-produced vibration of the band as it passes through the work zone, whereby said fluid film maintaining means coacts with the displacement of the band from said plane of tangency to assure flutter-free straight line travel of the band through the work zone.

2. The machine of claim 1, wherein said band supports are stationary shoes.

3. The machine of claim 2, wherein said shoes have upstream and downstream ends with respect to the direction of band travel, and wherein said means for maintaining a film of fluid in the interface between the band and said surface of each of the shoes comprises duct means having a discharge mouth debouching into the upstream end of the interface.

4. The machine of claim 2, wherein said surfaces of the shoes are so shaped that neither in approaching the upstream shoe nor in leaving the downstream shoe will the band be flexed sharper than a curvature having a five-inch radius.

5. The machine of claim 2 wherein said surfaces of the shoes have portions thereof curved and tangent to the stretches of the band extending from the shoes to the pulleys and also to the intervening cutting stretch of the band, and wherein the curvature of their curved surfaces has a radius in excess of about five inches.

6. The machine of claim 2, further characterized by a backup shoulder fixed with respect to each shoe and slidably engaged by the smooth back edge of the band.

7. The machine of claim 2, wherein the band supporting portions of the shoes are formed of resilient material.

8. The machine of claim 7, wherein said resilient material is a plastic on the order of polyurethane.

9. The machine of claim 2, wherein the band supporting portion of each shoe comprises a bar of resilient material so mounted that it is free to flex and conform itself to the band riding thereover.

References Cited

UNITED STATES PATENTS

| | | | |
|---|---|---|---|
| 833,538 | 10/1906 | Mershon | 143—160 X |
| 2,104,258 | 1/1938 | Hunter et al. | 143—160 X |
| 3,104,576 | 9/1963 | Robinson | 83—201.15 X |

FOREIGN PATENTS

| | | |
|---|---|---|
| 1,416,296 | 9/1965 | France. |
| 277,677 | 1/1928 | Great Britain. |

JAMES M. MEISTER, Primary Examiner.

U.S. Cl. X.R.

51—148; 83—20.114, 20.115